United States Patent
Sherif et al.

(10) Patent No.: US 7,650,160 B2
(45) Date of Patent: Jan. 19, 2010

(54) DETERMINING LATENCY ASSOCIATED WITH PUSH-TO-TALK COMMUNICATIONS

(75) Inventors: Mahmoud Ragaei Sherif, Landing, NJ (US); Ahmed A. Tarraf, Bayonne, NJ (US)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 492 days.

(21) Appl. No.: 11/474,611

(22) Filed: Jun. 26, 2006

(65) Prior Publication Data

US 2007/0298823 A1    Dec. 27, 2007

(51) Int. Cl.
*H04B 7/00* (2006.01)

(52) U.S. Cl. ............... 455/518; 455/90.2; 455/67.7; 455/67.16

(58) Field of Classification Search ............... 455/18, 455/24, 515, 517, 518, 519, 520, 67.11, 67.14, 455/67.16, 69, 70, 464, 90.2; 370/252, 516, 370/350, 395, 519, 342, 335, 248, 331
See application file for complete search history.

(56) References Cited

U.S. PATENT DOCUMENTS

| | | | |
|---|---|---|---|
| 5,710,798 A * | 1/1998 | Campana, Jr. ............... 375/347 |
| 2004/0151210 A1* | 8/2004 | Wilson et al. ............... 370/516 |
| 2004/0171400 A1* | 9/2004 | Rosen et al. ................ 455/518 |
| 2005/0111432 A1* | 5/2005 | Ekstrom et al. ............. 370/350 |
| 2006/0019681 A1* | 1/2006 | Harris et al. ................ 455/464 |
| 2006/0099982 A1* | 5/2006 | Nisbet ........................ 455/518 |
| 2006/0142036 A1* | 6/2006 | Lim ............................ 455/518 |
| 2007/0217343 A1* | 9/2007 | Znamova et al. ............ 370/252 |
| 2007/0242702 A1* | 10/2007 | Shim .......................... 370/516 |
| 2008/0025283 A1* | 1/2008 | Chin et al. .................. 370/342 |

* cited by examiner

*Primary Examiner*—Tan Trinh
(74) *Attorney, Agent, or Firm*—Carlson, Gaskey & Olds PC (57) ABSTRACT

A method of determining at least an estimate of media latency for push-to-talk communications includes determining a first time associated with transmitting a first packet from a push-to-talk transceiver device. In a disclosed example, the same device receives a second packet that corresponds to the first packet and includes an indication of the first time, a second time associated with receipt of the first packet by another device such as a push-to-talk server and a third time associated with transmission of the second packet to the push-to-talk transceiver device. That same device determines a fourth time associated with receipt of the second packet. In a disclosed example, the push-to-talk transceiver device uses a relationship between the first time, second time, third time and fourth time for determining at least an estimate of media latency associated with the push-to-talk communication corresponding to the first and second packets. A plurality of latency test procedures are disclosed.

13 Claims, 8 Drawing Sheets

DETERMINING LATENCY ASSOCIATED WITH PUSH-TO-TALK COMMUNICATIONS

FIELD OF THE INVENTION

This invention generally relates to communication. More particularly, this invention relates to determining latency associated with push-to-talk wireless communications.

DESCRIPTION OF THE RELATED ART

Wireless communication systems are well known. Some mobile stations or handsets used for wireless communications have a so-called push-to-talk capability. Typically, such devices allow an individual to activate a switch, by pushing a button for example, indicating a desire to speak. The device then receives a floor grant and provides a prompt such as an audible chirp indicating that the device is ready for the individual to speak. After the individual is done talking, they deactivate the switch (e.g., release the button).

Typical push-to-talk systems are half-duplex and allow for communication in only one direction at any given time. The switch activation by pushing buttons on a handset allows for the system facilitating the wireless communications to know which direction the signals should be traveling.

One feature of push-to-talk systems that is of concern is the latency or delay associated with such systems. One type of latency is known as push-to-chirp latency. The other is referred to as media latency. There are known techniques for measuring each type of latency. Typically, relatively expensive testing equipment is required to determine media latency.

Media latency is defined as the time it takes the speech of the sender to travel from the mouth at the sender side until it is received or audible at the speaker or earpiece of the receiving side. Within media latency there are two performance metrics of interest. Initial media latency is associated with the initiation of a push-to-talk communication session. There are two types of initial media latency. A dormant initial latency is the mouth-to-ear latency when the receiving or terminating handset is dormant. Under such conditions, the traffic channel is not set up. This is the most common case for initial media latency. Active initial latency is the mouth-to-ear latency when the terminating or receiving handset is active. Under such conditions, the traffic channel is already set up.

There is also in-call media latency, which is the mouth-to-ear latency when both handsets involved in the communication session are active. Under such conditions, the traffic channel is already set up.

Determining these types of latency typically requires expensive testing equipment. It would be useful to provide an automated way of determining such latency for evaluating system or device performance. This invention facilitates automated latency determination.

SUMMARY OF THE INVENTION

An exemplary method of determining latency includes transmitting a first packet from a push-to-talk (PTT) transceiver device including an indication of a first time associated with transmitting the first packet. A second packet is later received by the same PTT transceiver device. The second packet includes an indication of the first time, a second time associated with another device receiving the first packet and a third time associated with transmitting the second packet to the PTT transceiver device. A determination is then made regarding the latency based upon a relationship between the first, second and third times and a fourth time associated with the mobile station receiving the second packet. The determined latency provides an indication of media latency for a push-to-talk communication.

In one example, a handset having push-to-talk capability includes a capability of determining the first time associated with transmitting the first packet and determining the fourth time associated with receiving the second packet. A push-to-talk server that receives the first packet and transmits the second packet has the capability of determining the second time associated with receiving the first packet and the third time associated with transmitting the second packet.

The various features and advantages of this invention will become apparent to those skilled in the art from the following detailed description. The drawings that accompany the detailed description can be briefly described as follows.

DETAILED DESCRIPTION

An example embodiment of this invention is described that facilitates automatically determining at least an estimate of media latency associated with push-to-talk (PTT) communications. In a disclosed example, a PTT transceiver device (e.g., a handset) has the capability of determining a time associated with transmitting a first packet corresponding to a voice communication, for example. The handset also has the capability of determining another time when a second packet corresponding to the same voice communication, for example, is received by the handset. The handset interacts with a server, which provides an indication of a time associated with receipt of the first packet and a time associated with transmitting the second packet. A relationship between the times associated with transmitting and receiving the packets is used for automatically determining a media latency associated with that communication.

Figure 1:
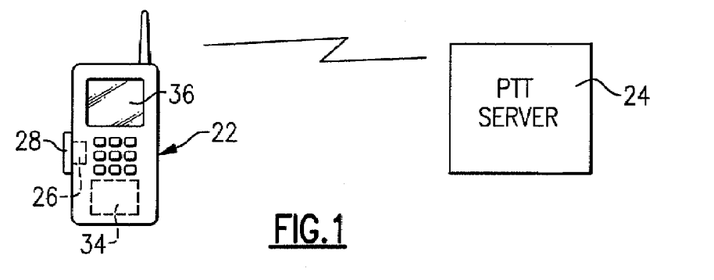
FIG. 1 schematically illustrates selected portions of an example embodiment of communication equipment having push-to-talk capabilities that is useful with an embodiment of this invention.

FIG. 1 schematically shows selected portions of a communication system that has PTT capability. A PTT transceiver device, which in the illustrated example is a mobile station 22, communicates with a PTT server 24 using a known protocol, for example. In this example, the mobile station 22 includes a switch 24 that is activated by pushing a button 26 to provide an indication that an individual desires to use the mobile station 22 for a voice communication, for example. The example mobile station 22 includes a transceiver portion 28 for transmitting packets to the PTT server 24 and for receiving packets from the PTT server 22.

Figure 2:
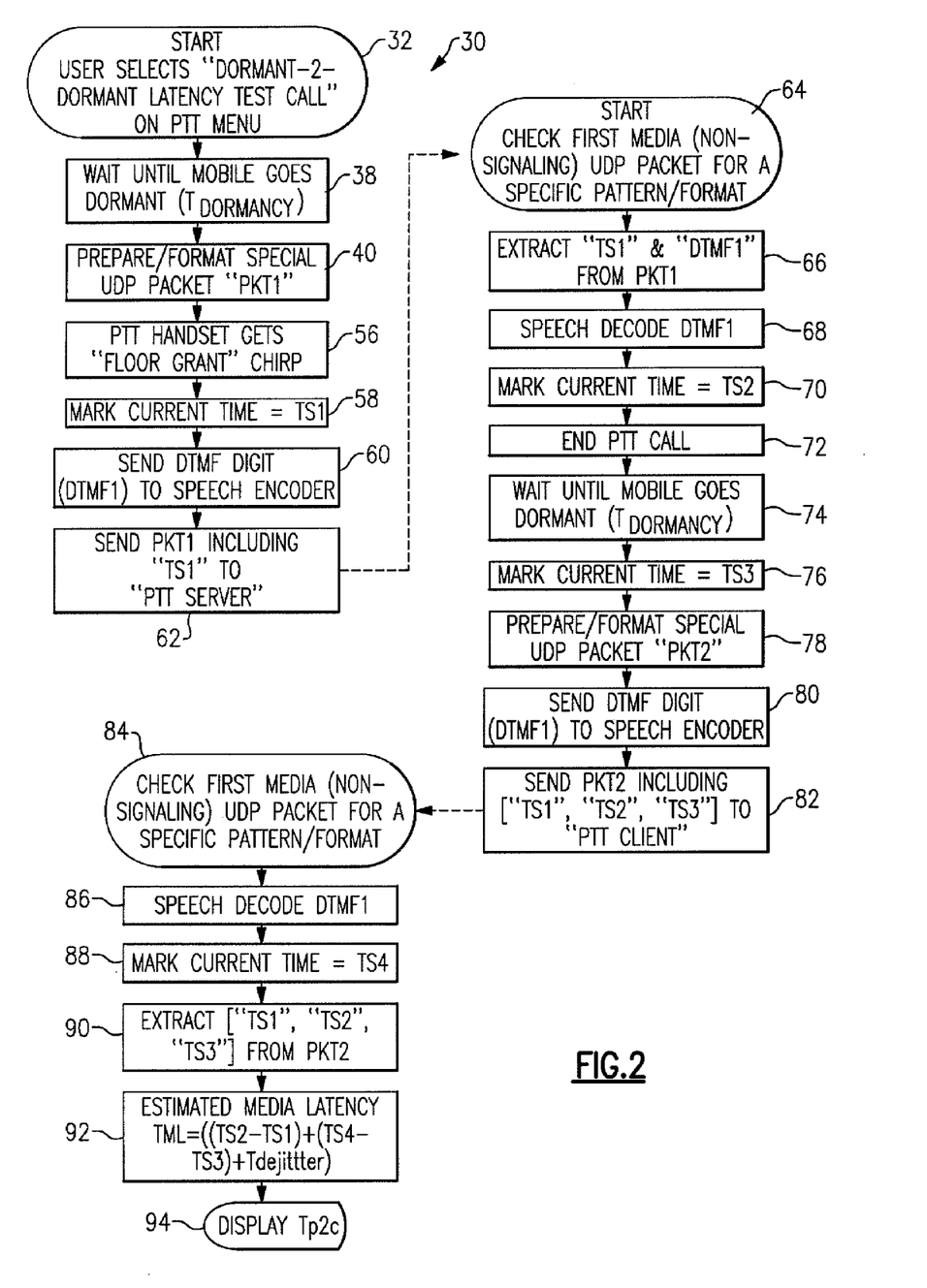
FIG. 2 is a flowchart diagram summarizing one example approach useful with an embodiment of this invention.

FIG. 2 includes a flowchart diagram 30 that summarizes one example approach of using the example mobile station 22 for determining a media latency associated with a PTT communication.

The example of FIG. 2 begins at 32 where a user selects from a menu choice available on the mobile station 22 indicating that a dormant-to-dormant latency test call is desired. This selection sends a floor grant request to the PTT server 24. A dormant-to-dormant latency test in this example is intended to provide a determination regarding media latency for situations when the communication is initiated when the sending and receiving handsets are both dormant.

The example mobile station 22 includes a processor 34 that presents the appropriate menu selections for media latency tests to an individual on a display 36 on the mobile station 22. In one example, such a processor is included only on a device that is used for testing purposes. Such a processor need not be included on a PTT device used by typical consumers of wireless communication services, for example. In one example, the processor 34 is part of the PTT client software, but is normally disabled for typical consumers. Such an arrangement can be enabled selectively for testing purposes.

Figure 3:
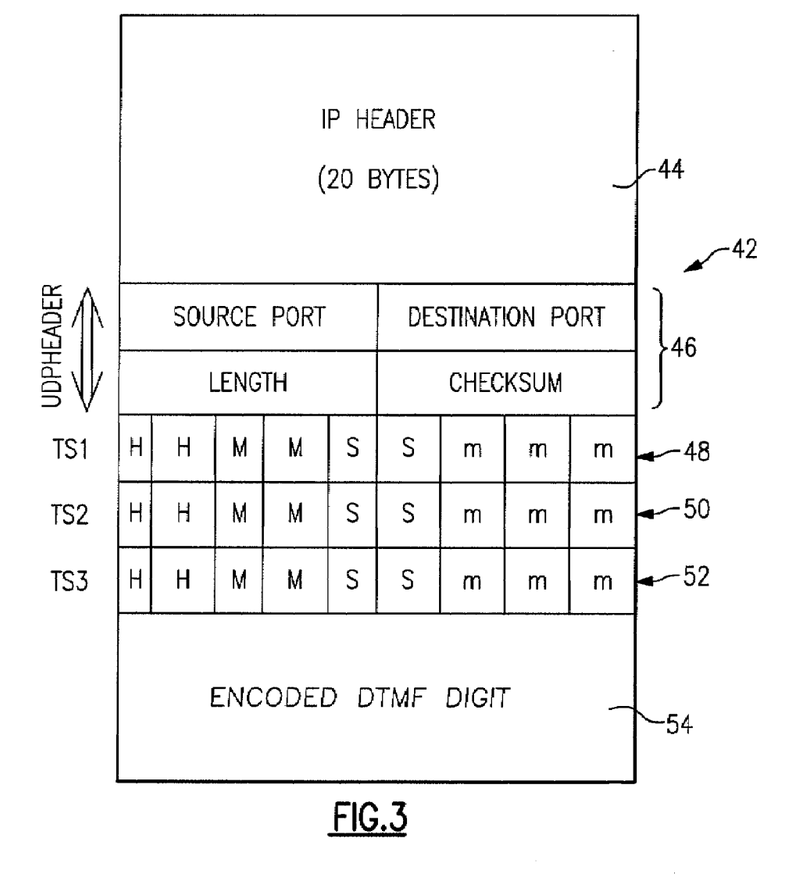
FIG. 3 schematically illustrates an example packet format useful with an embodiment of this invention.

As shown at 38 in FIG. 2, the processor 34 waits until the mobile station 22 goes dormant. One example includes a dormancy timer that operates a sufficient period of time to allow the mobile station 22 to become dormant before the testing procedure proceeds. At 40, the processor 34 prepares a special packet that is referred to as a first packet for discussion purposes. In one example, the first packet is a UDP packet that has a format as schematically shown in FIG. 3.

In this example, the packet 42 has a 20 byte internet protocol header 44 and a UDP header section 46 including entries consistent with known UDP headers. The example packet 42 also has three time entry fields 48, 50 and 52, which are used for including an indication of a time associated with transmitting the packet, receiving the packet, transmitting another packet or receiving another packet as will be described below.

The example packet 42 includes a dual tone multiple frequency (DTMF) payload portion 54, which corresponds to an actual voice communication. In this example, an encoded DTMF digit is included as the payload 54.

Referring to FIG. 2, preparing or formatting the first packet at 40 includes setting up the IP header portion 44 and the UDP header portions 46. At 56, the mobile station 22 receives a so-called floor grant chirp. At that time, the processor 34 determines a current time at 58. In one example, a global positioning system time stamp available through a known SYNC channel is used to provide the current time determined at 58. An indication of the determined current time is placed into the first time field 48 of the first packet.

At 60, the processor 34 speech end codes a DTMF digit and that is included in the payload field 54 of the first packet. At 62, the first packet is transmitted from the mobile station 22 to the PTT server 24.

At 64, the PTT server detects the transmission from the mobile station 22. The PTT server 24 in this example is programmed to recognize the special UDP packet (e.g., the first packet) from the mobile station 22, as an indication that a latency test is in progress. At 66, the PTT server 24 extracts the first time information from the time field 48 of the first packet. The PTT server 24 decodes the DTMF digit from the payload portion 54 of the first packet at 68. At 70, the PTT server 24 determines a current time. A global positioning system timestamp is used for this purpose in one example. At 72, the PTT server 24 ends the PTT call.

At 74, the PTT server 24 waits a sufficient time for the mobile station 22 to again become dormant. One example includes waiting for a dormancy timer to expire after the step at 72 is completed. This facilitates using the mobile station 22 for a dormant-to-dormant situation latency test.

Once a sufficient time has passed, the PTT server 24 determines a third time at 76. The second time determined at 70 is associated with the time for receiving the first packet from the mobile station 22. The third time determined at 76 is associated with transmitting a second packet from the PTT server 24 to the mobile station 22.

At 78, the PTT server 24 prepares or formats a second packet consistent with the format of the packet 42 shown in FIG. 3 in one example. The data field 48 includes an indication of the first time from the first packet. The data field 50 includes an indication of the second time associated with receiving the first packet as determined at 70. The data field 52 will be populated with data indicating the third time determined at 76, which is associated with transmitting the second packet to the mobile station 22.

At 80, the PTT server 24 encodes the same DTMF digit that was included in the first packet and includes that in the payload portion 54 of the second packet. At 82, the PTT server 24 sends the second packet to the mobile station 22. The second packet includes an indication of the first, second and third times and the encoded DTMF digit payload 54.

As shown at 84, the mobile station 22 receives the second packet and detects that it is intended for the latency test that is in progress. At 86, the processor 34 decodes the encoded DTMF digit. At 88, the processor 34 determines a fourth time associated with receipt of the second packet by the mobile station 22. In one example, the fourth time information is gathered from a GPS time stamp. At 90, the processor 34 extracts the first, second and third times from the time fields 48, 50 and 52, respectively, in the second packet received from the PTT server 24.

At 92, the processor 34 determines an estimate of the media latency based upon a relationship between the first, second, third and fourth times determined at the steps schematically shown at 58, 70, 76 and 88, respectively in this example.

In one example, the determined estimated media latency is based upon the following relationship:

$$TML = ((TS2 - TS1) + (TS4 - TS3) + (Tdejitter))$$

where $TSn$ is the $n^{th}$ time determined above and $Tdejitter$ is a typical dejitter buffer size, which is a known quantity based upon buffer processing capabilities of the mobile station 22, the PTT server 24 or both.

The example of FIG. 2 includes displaying the determined media latency time TML on the display 36 of the mobile station 22 at 94. That information can then be used as desired by the individual or organization conducting the latency test.

Figure 4:
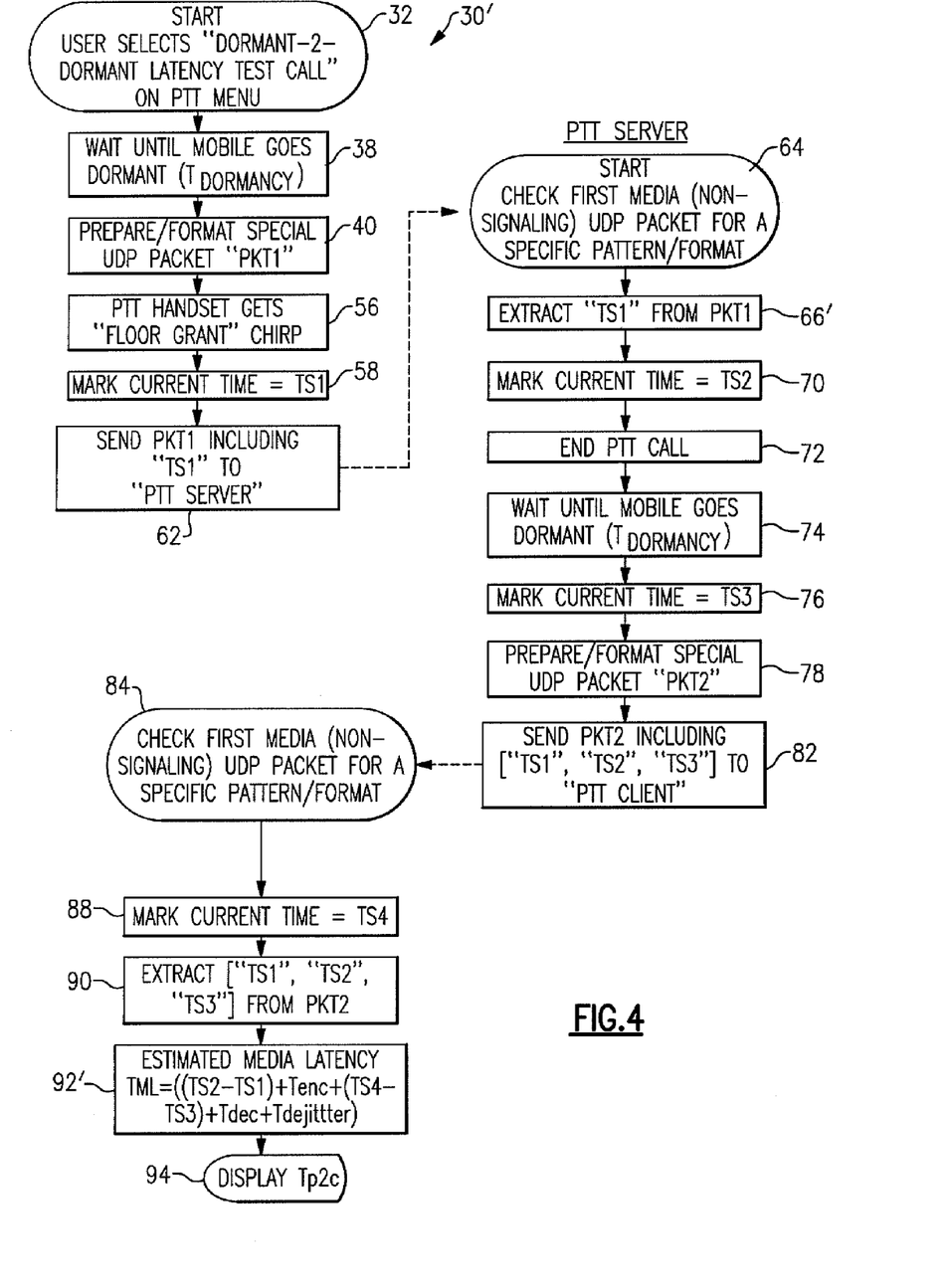
FIG. 4 is a flowchart diagram of another example approach useful with an embodiment of this invention.
Figure 5:
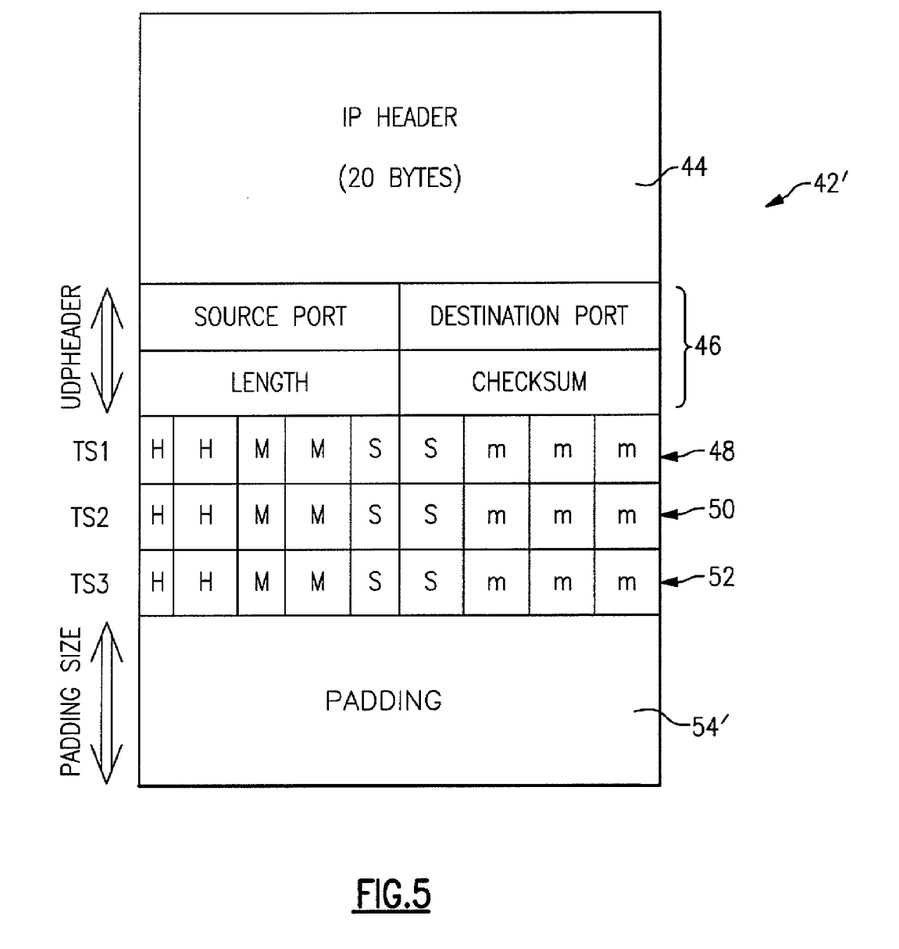
FIG. 5 schematically illustrates another example packet format useful with an embodiment of this invention.

FIG. 4 includes a flowchart diagram 30' that summarizes another example approach of conducting a dormant-to-dormant latency test. In this example, steps that are similar or the same as those shown in FIG. 2 have the same reference numerals. The differences between the examples of FIGS. 2 and 4 include that the step 60 from the example of FIG. 2 is not used in the example of FIG. 4. There is no encoding of a DTMF digit to include in the payload portion 54 of the first packet. Instead, the first packet has a format as schematically shown in FIG. 5.

This example packet format is similar to that shown in FIG. 3 except that the payload portion 54' includes padding to provide a payload size that corresponds to a typical UDP packet size. The padding in the payload 54' is intended to make the packet 42' close to a real voice packet at least in size. The other fields of the packet 42' correspond to those in the packet 42 of the example of FIG. 3.

In one example, the size of the padding in the payload portion 54' is determined based upon a typical size of a UDP packet minus the twenty bytes used for the IP header section 44, minus the eight bytes used for the UDP header section 46 and minus four bytes for each of the data fields 48, 50, 52, which include timestamp data. For example, the first packet will only include the field 48 populated with data while the fields 50 and 52 will be blank. Accordingly, only four bytes are subtracted from the typical UDP size so that the size of the padding in the payload portion 54' will bring the entire packet 42' into conformance with a typical UDP packet size.

As known, the size of a typical UDP packet for a PTT arrangement depends on the number of encoded voice frames that are bundled into one UDP packet. The size of the packet also depends on the speech codec that is used.

One example includes using padding with in the payload portion 54' that does not constitute all zeros. One example includes using a real encoded speech frame or multiple real encoded speech frames. Using padding that includes actual encoded speech frames provides the ability to more accurately experience the same media latency during a test procedure as would be experienced during an actual UDP packet transmission carrying real encoded speech frames.

Referring again to FIG. 4, because the step 60 from the example of FIG. 2 is eliminated, the decoding step at 68 from FIG. 2 need not be performed by the PTT server 22. The example of FIG. 4 also does not include the step 80, which was included in the example of FIG. 2.

Because there is no encoded DTMF digit included in the second packet in FIG. 4, the mobile station 22 need not perform the step at 86, which was included in the example of FIG. 2.

The relationship used for determining the estimated media latency in the example of FIG. 4 is shown in the step 92', which is $$TML = ((TS2 - TS1) + Tenc + (TS4 - TS3 + TDEC + Tdejitter))$$

Where Tenc is the typical audio encoding time, Tdec is the typical audio decoding time and Tdejitter is the typical dejtter size, each of which is a known system parameter from a given PTT system.

One difference between the examples of FIG. 2 and FIG. 4 is that the example of FIG. 2 can be considered more generic in that there is no need to know the three system parameters used at the step 92' in FIG. 4. The example of FIG. 2 also does not require real encoded speech frames, but instead uses the DTMF capability to generate tones already present on the mobile station 22. Each of the examples of FIGS. 2 and 4 provides the ability to determine media latency when an originating and a terminating handset are both dormant prior to the PTT communication session.

Figure 6:
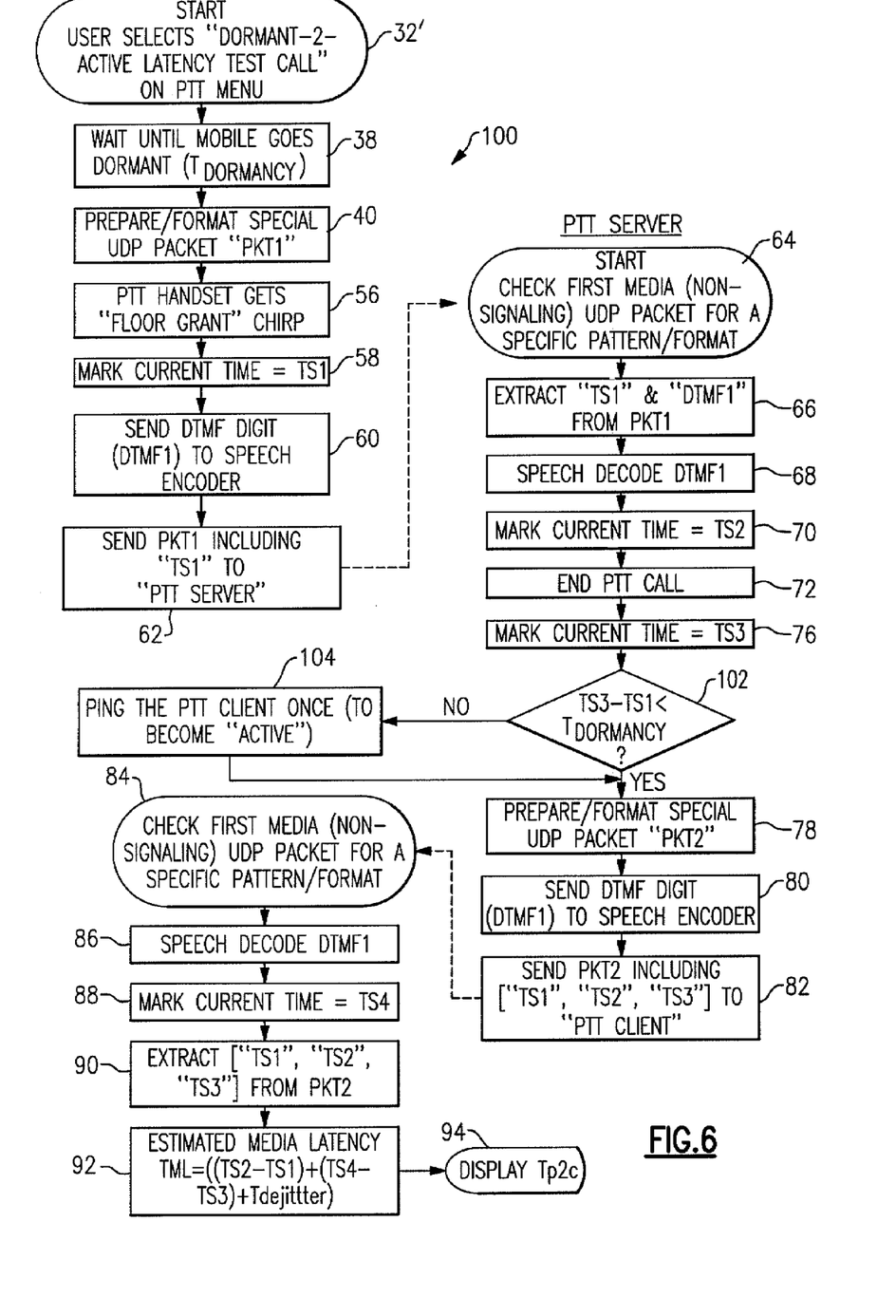
FIG. 6 is a flowchart diagram of another example approach useful with an embodiment of this invention.

FIG. 6 includes a flowchart diagram 100 which summarizes one example approach for conducting a dormant-to-active latency test, which corresponds to a situation where the originating handset is dormant but the receiving handset is active at the initiation of the PTT communication session. As many of the steps in the example of FIG. 6 correspond to those already described in the example of FIG. 2, the same reference numerals are used for such steps.

Compared to the example of FIG. 2, the example of FIG. 6 does not include the step 74, which is included in the example of FIG. 2 There is no need to wait until the mobile station 22 becomes dormant after the first packet has been received by the PTT server 24 in the example of FIG. 6. In this case, the mobile station 22 should be active before the second packet is sent to the mobile station 22. Accordingly, the example of FIG. 6 includes a step at 102 where a determination is made whether the time that has elapsed between the first time determined at 58 and the third time determined at 76 is less than the amount of time it would take for the mobile station 22 to become dormant. In the event that the dormancy timer has not expired, the step at 78 is carried out.

In the event that enough time has transpired between the first time determined at 58 and the third time determined at 76, the example of FIG. 6 includes a step at 104 where the PTT server 24 sends a signal to the mobile station 22 to wake up the mobile station so that it is active before the second packet is transmitted to it. The remaining steps in the example of FIG. 6 are the same as those used in the example of FIG. 2.

Figure 7:
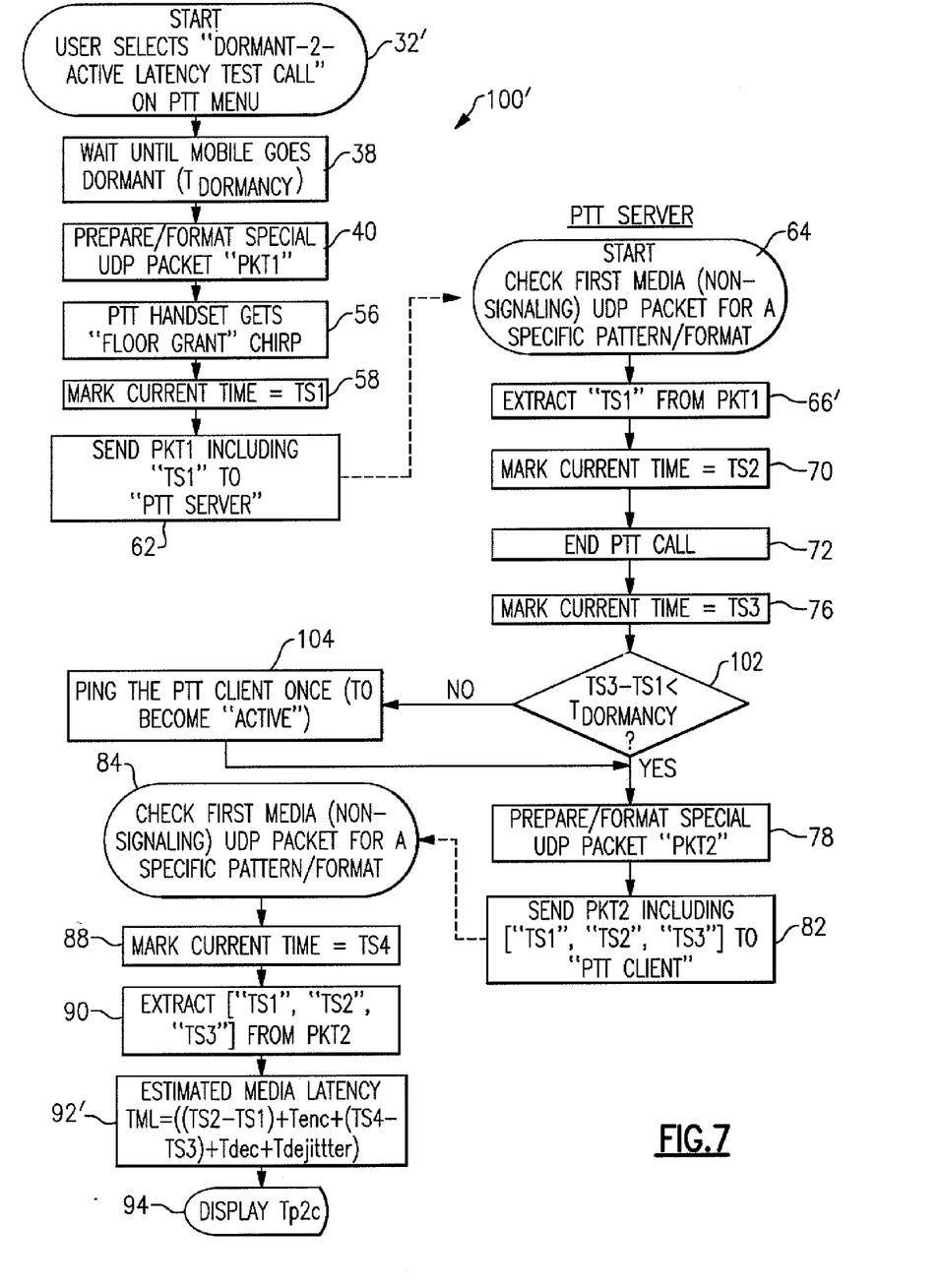
FIG. 7 is a flowchart diagram of another example approach useful with an embodiment of this invention.

FIG. 7 includes a flowchart diagram 100' that summaries another example dormant-to-active latency test. The difference between the example of FIG. 6 and the example of FIG. 7 is that the former uses an encoded DTMF digit in the payload portion 54 of the first and second packets, which have the packet format 42 of FIG. 3, while the example of FIG. 7 includes first and second packets including padding within a payload portion 54' as schematically shown in FIG. 5. That is why the steps 60, 68, 80 and 86, which are included in the example of FIG. 6, are not included in the example of FIG. 7. Additionally, the example of FIG. 7 differs from that in FIG. 6 because a different relationship between the various determined times is used for determining the estimated media latency. The example of FIG. 7 includes the step at 92', which is the same relationship used in the example of FIG. 4 described above.

Figure 8:
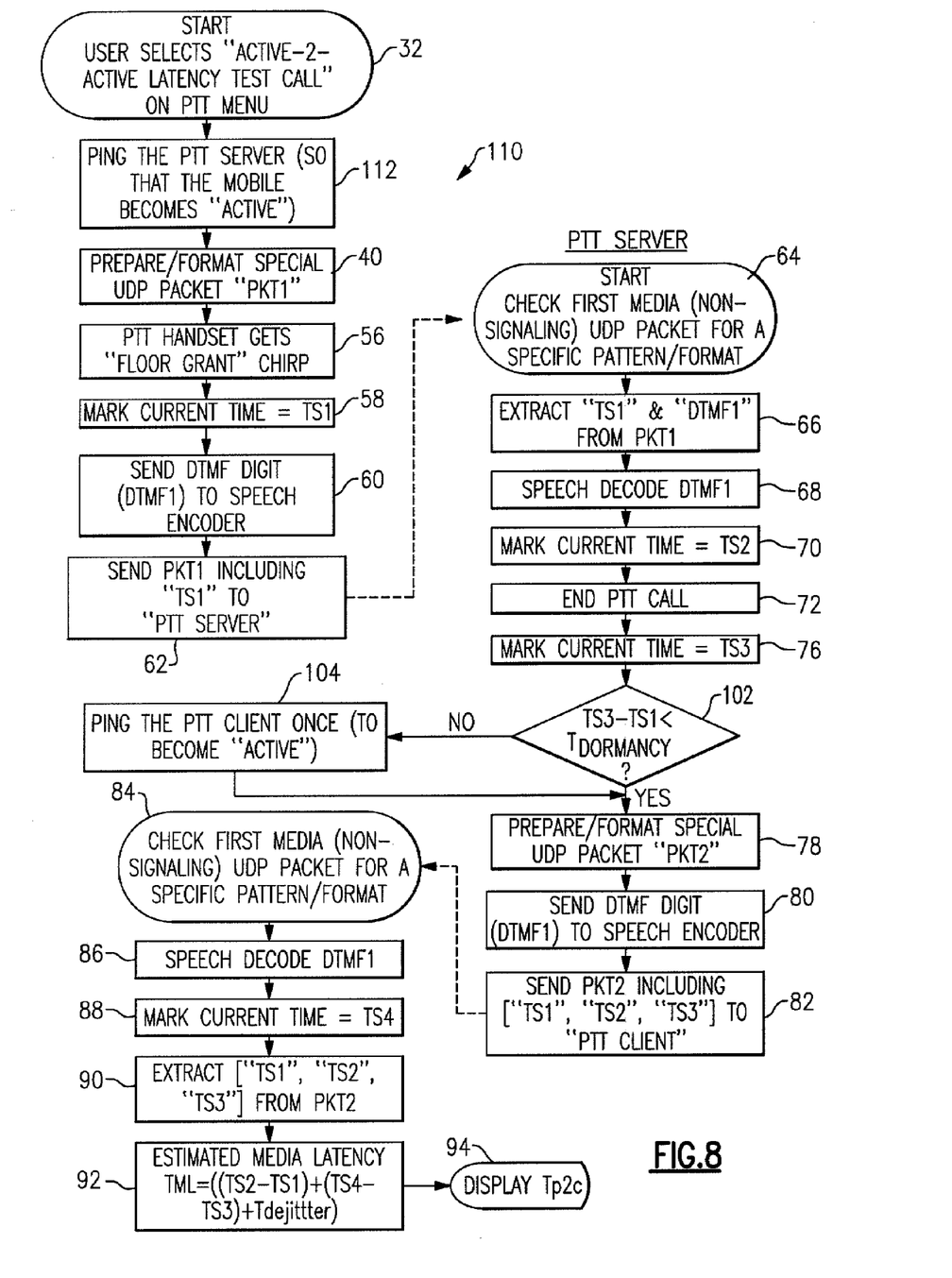
FIG. 8 is a flowchart diagram of another example approach useful with an embodiment of this invention.

FIG. 8 includes a flowchart diagram 110 summarizing another example latency test. This example is an active-to-active latency test because the sender and receiver PTT transceiver devices are both active in such a situation. Under such circumstances, the channel used for the PTT communications is already set up.

In the example of FIG. 8, many of the steps are the same as those already described in connection with the other examples. Those steps that have the same reference numerals as already used will not be described again. One difference between the example of FIG. 8 and the other examples is that a step 112 includes the mobile station 22 sending a message to the PTT server 24 so that the mobile station becomes active and is recognized by the PTT server 24 as such.

Like the examples of FIGS. 6 and 7, there is no step 74 such as was included in the example of FIGS. 2 and 4 because the mobile station 22 should be active and ready for receipt of the second packet. The steps at 102 and 104 in the example of FIG. 8 ensure that the mobile station 22 will be active for receipt of the second packet. The determined estimate of the media latency in this example includes using the same relationship as was used in FIG. 2 based upon the determined first, second, third and fourth times and the dejitter time.

Figure 9:
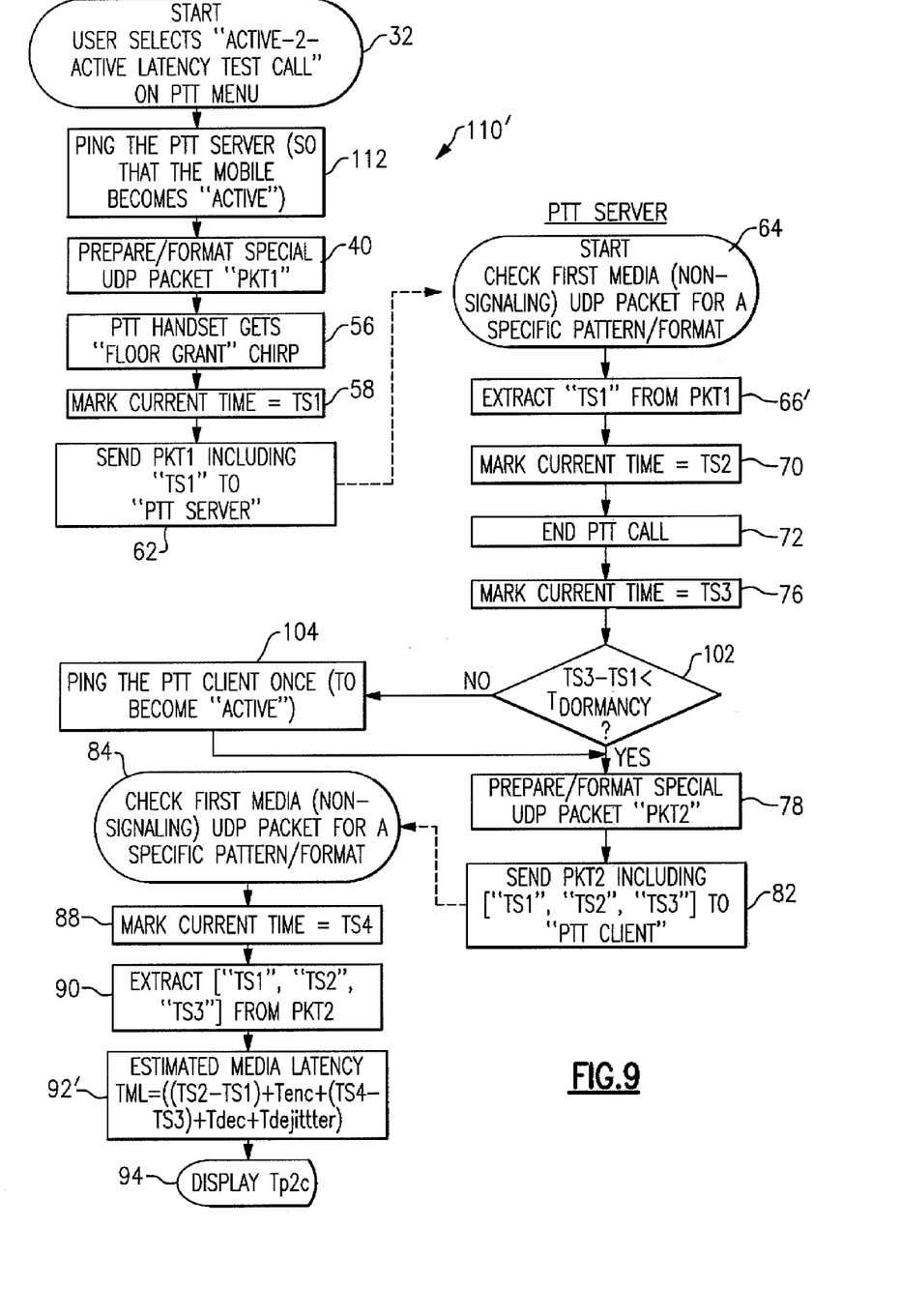
FIG. 9 is a flowchart diagram of another example approach useful with an embodiment of this invention.

FIG. 9 illustrates another example active-to-active latency test procedure. A flowchart diagram 110' summarizes this example approach. In this case, a payload including padding such as shown at 54' in FIG. 5 is included as part of the first and second packets. Accordingly, the step 60 is omitted from the flowchart 110'. The example of FIG. 9 differs from FIG. 8 also in that the step 66' replaces the step 66 and there is no step 80 at the PTT server 24. Lastly, the step 86 of FIG. 8 is omitted from the example of FIG. 9. The relationship between the first, second, third and fourth times used in the example of FIG. 9 is included in the step 92', which is the same as the relationship used for the example of FIGS. 4 and 7.

As can be appreciated from the preceding description, example embodiments of this invention facilitate automated determinations of various kinds of media latency associated with PTT communications. Using a PTT transceiver device that performs the functions described above and programming a PTT server to perform the functions described above provides the advantage of not requiring expensive testing equipment and complicated testing procedures for making determinations regarding media latency associated with PTT communications.

The preceding description is exemplary rather than limiting in nature. Variations and modifications to the disclosed examples may become apparent to those skilled in the art that do not necessarily depart from the essence of this invention. The scope of legal protection given to this invention can only be determined by studying the following claims.

We claim:

1. A method of determining latency, comprising the steps of:
   transmitting a first packet from a push-to-talk (PTT) transceiver device, the first packet including at least an indication of a first time associated with transmitting the first packet;
   receiving a second packet at the PTT transceiver device, the second packet corresponding to the first packet and including at least an indication of the first time, a second time associated with another device receiving the first packet and a third time associated with a transmission of the second packet;
   determining a fourth time associated with receiving the second packet at the PTT transceiver device; and
   determining latency from a relationship between the first, second, third and fourth times.

2. The method of claim 1, wherein the other device comprises a PTT server and the method comprises
   receiving the first packet at the PTT server;
   determining the second and third times at the PTT server; and
   transmitting the second packet to the PTT transceiver device from the PTT server.

3. The method of claim 2, comprising
   extracting the first time from the first packet; and
   determining the second time responsive to the extracting.

4. The method of claim 3, comprising
   ending a PTT call after determining the second time;
   ensuring that the PTT transceiver device is one of dormant or active; and
   determining the third time after the ensuring.

5. The method of claim 1, comprising
   determining the first time responsive to the PTT transceiver device receiving a floor grant indicating that the PTT transceiver device can transmit the first packet.

6. The method of claim 1, comprising
   allowing the PTT transceiver device to become dormant before transmitting the first packet; and
   allowing the PTT transceiver device to become dormant after transmitting the first packet and before receiving the second packet.

7. The method of claim 1, comprising
   allowing the PTT transceiver device to become dormant before transmitting the first packet; and
   ensuring that the PTT transceiver device is active before receiving the second packet.

8. The method of claim 1, comprising
   ensuring that the PTT transceiver device is active during the transmitting and receiving steps.

9. The method of claim 1, comprising
   encoding a dual tone multiple frequency digit;
   including the encoded dual tone multiple frequency digit as part of the first packet; and
   decoding the encoded dual tone multiple frequency digit from the received second packet.

10. The method of claim 9, comprising
    determining the fourth time responsive to the decoding.

11. The method of claim 1, comprising
    including padding as part of the first packet, the padding having a size such that the first packet has a size corresponding to a packet used for an audible PTT communication.

12. The method of claim 1, wherein the relationship comprises a total of a difference between the second time and the first time plus a difference between the fourth time and the third time plus a dejitter time associated with at least a dejitter buffer of the PTT transceiver device.

13. The method of claim 1, wherein the relationship comprises a total of a difference between the second time and the first time plus a difference between the fourth time and the third time plus a dejitter time associated with at least a dejitter buffer of the PTT transceiver device plus an audio encoding time plus an audio decoding time.

* * * * *

UNITED STATES PATENT AND TRADEMARK OFFICE
CERTIFICATE OF CORRECTION

PATENT NO.       : 7,650,160 B2
APPLICATION NO.  : 11/474611
DATED            : January 19, 2010
INVENTOR(S)      : Sherif et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 699 days.

Signed and Sealed this

Twenty-third Day of November, 2010

David J. Kappos
*Director of the United States Patent and Trademark Office*